(12) United States Patent
Fujiwara

(10) Patent No.: US 11,385,711 B2
(45) Date of Patent: Jul. 12, 2022

(54) IMAGE CAPTURING CONTROL APPARATUS AND CONTROL METHOD THEREFOR

(71) Applicant: CANON KABUSHIKI KAISHA, Tokyo (JP)

(72) Inventor: Shogo Fujiwara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/152,295

(22) Filed: Jan. 19, 2021

(65) Prior Publication Data
US 2021/0223860 A1 Jul. 22, 2021

(30) Foreign Application Priority Data

Jan. 21, 2020 (JP) .............................. JP2020-007424

(51) Int. Cl.
*G06F 3/01* (2006.01)
*H04N 5/232* (2006.01)

(52) U.S. Cl.
CPC ....... *G06F 3/013* (2013.01); *H04N 5/232127* (2018.08); *H04N 5/232945* (2018.08)

(58) Field of Classification Search
CPC .............. G06F 3/013; H04N 5/232945; H04N 5/232127; H04N 5/23245; H04N 5/23293; H04N 5/22525
USPC .................................................. 348/333.03
See application file for complete search history.

(56) References Cited

U.S. PATENT DOCUMENTS

| | | | | |
|---|---|---|---|---|
| 7,515,197 B2* | 4/2009 | Suzuki | ............... | H04N 5/23245 348/333.03 |
| 10,019,058 B2* | 7/2018 | Kawana | ..................... | G06T 7/73 |
| 10,511,758 B2* | 12/2019 | Hong | ..................... | G06V 40/10 |
| 10,747,308 B2* | 8/2020 | Okabe | ..................... | G06F 3/038 |
| 11,003,242 B2* | 5/2021 | Rohrbacher | ......... | G06F 3/04842 |
| 11,250,263 B2* | 2/2022 | Asbun | ..................... | G16H 40/67 |
| 2014/0085451 A1* | 3/2014 | Kamimura | ......... | H04N 5/23219 348/78 |
| 2014/0354539 A1* | 12/2014 | Skogo | ..................... | G06F 3/013 345/156 |
| 2015/0062402 A1* | 3/2015 | Kudo | ................. | H04N 5/23293 348/333.02 |

(Continued)

FOREIGN PATENT DOCUMENTS

JP 2002-082278 A 3/2002
JP 2009-251658 A 10/2009

*Primary Examiner* — Pritham D Prabhakher
(74) *Attorney, Agent, or Firm* — Cowan, Liebowitz & Latman, P.C.

(57) ABSTRACT

An image capturing control apparatus includes: a line-of-sight detection unit detecting a line-of-sight position of a user; a setting unit setting a region, in which specific processing related to image capturing is performed, in accordance with the detected line-of-sight position; and a control unit implementing control such that in a case of a first state, where a change of at least a predetermined amount does not occur in a captured image and an imaging unit, during recording a moving image, a region in which the specific processing is performed based on the line-of-sight position of the user is not set, and that in a case of a second state, which is different from the first state and satisfies a predetermined condition, a region in which the specific processing is performed based on the line-of-sight position of the user, detected by the line-of-sight detection unit, is set.

17 Claims, 6 Drawing Sheets

(56) References Cited

U.S. PATENT DOCUMENTS

| | | | |
|---|---|---|---|
| 2016/0209919 A1* | 7/2016 | Kawana | G06F 3/013 |
| 2017/0026565 A1* | 1/2017 | Hong | H04N 5/23212 |
| 2017/0322679 A1* | 11/2017 | Gordon | G06N 20/00 |
| 2018/0173305 A1* | 6/2018 | Okabe | G06F 3/04842 |
| 2019/0020826 A1* | 1/2019 | Takehara | H04N 5/232127 |
| 2019/0028653 A1* | 1/2019 | Minami | H04N 5/23216 |
| 2019/0147618 A1* | 5/2019 | Sugimoto | G06V 40/193 348/222.1 |
| 2020/0007779 A1* | 1/2020 | Ogawa | H04N 5/23219 |
| 2020/0319705 A1* | 10/2020 | Rohrbacher | G06F 3/04842 |
| 2020/0336665 A1* | 10/2020 | Matsui | H04N 5/232939 |
| 2021/0203856 A1* | 7/2021 | Hirose | H04N 5/23216 |
| 2021/0216138 A1* | 7/2021 | Weksler | G06F 3/0489 |
| 2021/0357023 A1* | 11/2021 | Muta | G06F 3/013 |

* cited by examiner

IMAGE CAPTURING CONTROL APPARATUS AND CONTROL METHOD THEREFOR

BACKGROUND OF THE INVENTION

Field of the Invention

The present invention relates to an image capturing control apparatus, and more particularly to a technique of performing specific processing based on line-of-sight input.

Description of the Related Art

A techniques of detecting a position of the line-of-sight of a user and performing processing in accordance with the line-of-sight position is used. Japanese Patent Application Publication No. 2002-82278 discloses selecting a distance measurement region that is gazed at by a person who captures an image in accordance with the detected position of the line-of-sight. Further, Japanese Patent Application Publication No. 2009-251658 discloses selecting a menu item corresponding to the line-of-sight position of the user when blinking or nodding of the user is detected.

According to the method disclosed in Japanese Patent Application Publication No. 2002-82278, in the case of selecting a distance measurement region in accordance with the line-of-sight detected in image capturing processing, if the user shifts the user's line-of-sight from an image capturing target subject to another image capturing target subject while recording a moving image, the distance measurement region is also shifted to another subject unintended by the user. Hence, in the case of selecting a distance measurement region in accordance with blinking or nodding of the user, as disclosed in Japanese Patent Application Publication No. 2009-251658, the line-of-sight position or the position of the camera may be shifted at the moment of blinking or nodding, and a region unintended by the user may be selected as the distance measurement region.

SUMMARY OF THE INVENTION

With the foregoing in view, the present invention provides an image capturing control apparatus which reduces the possibility of executing processing unintended by the user when processing is executed based on the line-of-sight during recording a moving image.

An image capturing control apparatus of the present invention includes: a line-of-sight detection unit configured to detect a line-of-sight position of a user; a setting unit configured to set a region, in which specific processing related to image capturing is performed, in accordance with the line-of-sight position detected by the line-of-sight detection unit; and a control unit configured to implement control such that in a case of a first state, where a change of at least a predetermined amount does not occur in a captured image and an imaging unit, during recording a moving image, a region in which the specific processing is performed based on the line-of-sight position of the user is not set, and that in a case of a second state, which is different from the first state and satisfies a predetermined condition, a region in which the specific processing is performed based on the line-of-sight position of the user, detected by the line-of-sight detection unit, is set.

Further features of the present invention will become apparent from the following description of exemplary embodiments with reference to the attached drawings.

DESCRIPTION OF THE EMBODIMENTS

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

External View of Digital Camera

Figure 1A:
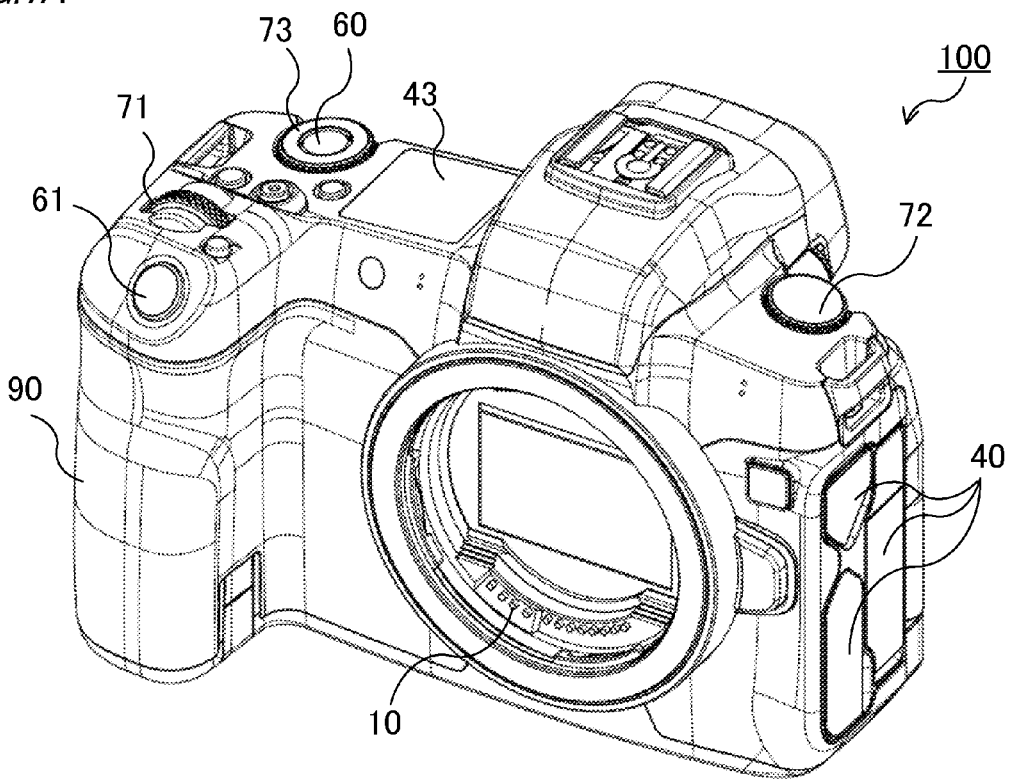
FIG. 1A and FIG. 1B are external views of a digital camera according to an embodiment.
Figure 1B:
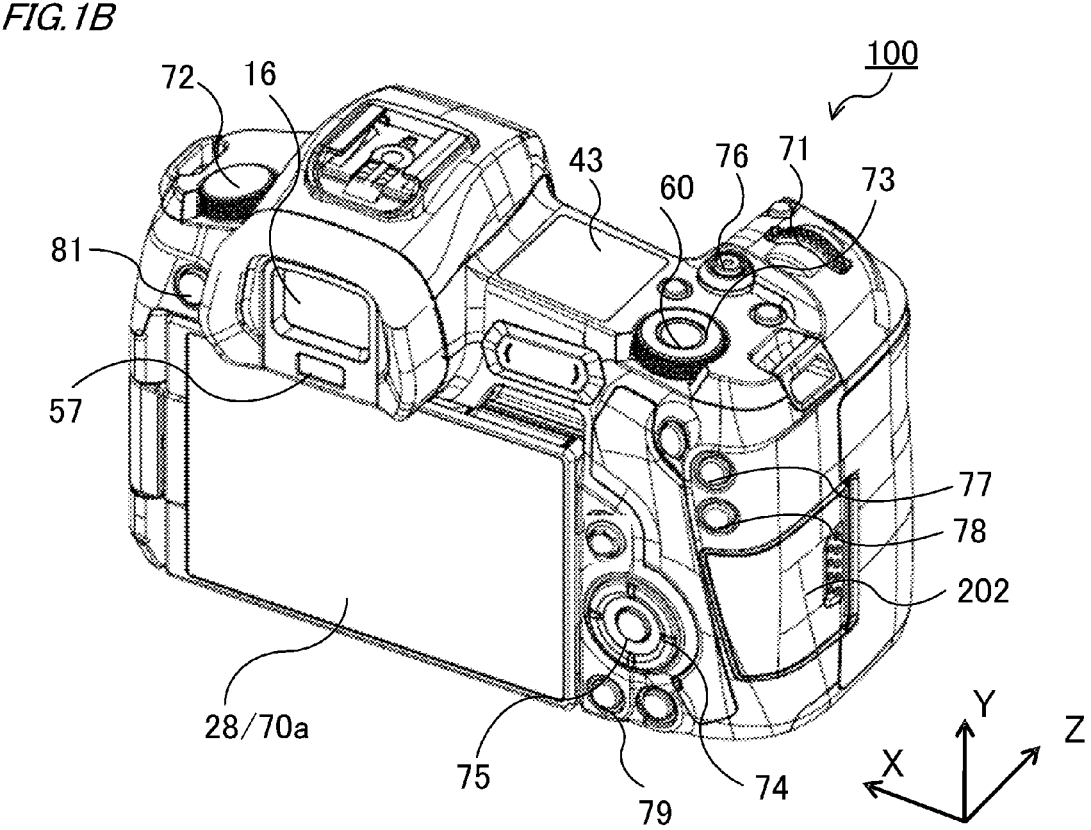

Preferred embodiments of the present invention will be described with reference to the drawings. FIG. 1A and FIG. 1B are external views of a digital camera 100, which is an example of an image capturing control apparatus to which the present invention is applicable. FIG. 1A is a front perspective view of the digital camera 100, and FIG. 1B is a rear perspective view of the digital camera 100.

A display unit 28 is a display unit disposed on the rear surface of the digital camera 100, and displays images and various information. A touch panel 70a detects the touch operation performed on the display surface (touch operation surface) of the display unit 28. An outer finder display unit 43 is a display unit disposed on the upper surface of the digital camera 100, and displays various set values of the digital camera 100, such as the shutter speed and aperture. The shutter button 61 is an operation member to instruct to capture an image. A mode selection switch 60 is an operation member to switch between various modes. Terminal covers 40 are covers to protect connectors (not illustrated) such as a connector for a connection cable to connect the digital camera 100 to an external apparatus.

A main electronic dial 71 is a rotational operation member, and such set values as the shutter speed and aperture can be changed by turning the main electronic dial 71. A power switch 72 is an operation member to switch the power supply of the digital camera 100 ON/OFF. A sub-electronic dial 73 is a rotational operation member, and movement of a selection frame (cursor) and image switching, for example, can be performed by turning the sub-electronic dial 73.

A four-direction key 74 is configured such that the upper part, lower part, left part and right part of the key can be pressed respectively, so that processing corresponding to the pressed part of the four-direction key 74 can be performed. A SET button 75 is a push button, and is mainly used to determine a selected item.

A video button 76 is used to start or stop moving image capturing (recording) in a moving image capturing mode. An AE lock button 77 is a push button, and the exposure state can be fixed by pressing the AE lock button 77 in an image capturing standby state. A magnifying button 78 is an operation button to switch a magnifying mode ON/OFF in a live view display of an image capturing mode. If the main electronic dial 71 is operated after setting the magnifying mode to ON, the live view image can be magnified or demagnified. In a reproduction mode, the magnifying button 78 functions as a button to magnify a reproduced image or to increase a magnification ratio.

A reproduction button 79 is an operation button to switch between the image capturing mode and the reproduction mode. If the reproduction button 79 is pressed in the image capturing mode, the mode changes to the reproduction mode, in which the latest image, out of images recorded in a recording medium 200 (described later with reference to FIG. 2), can be displayed on the display unit 28.

A menu button 81 is a push button that is used to instruct to display a menu screen, and if the menu button 81 is pressed, the menu screen, that allows various settings, is displayed on the display unit 28. The user can intuitively perform various settings using the menu screen displayed on the display unit 28, the four-direction key 74 and the SET button 75.

A communication terminal 10 is a communication terminal for the digital camera 100 to communicate with a detachable lens unit. An eye piece 16 is an eye piece portion of an eye piece finder (peep type finder), and the user can view an image displayed on an electric view finder (EVF) 29 (described later) via the eye piece 16. An eye contact detection unit 57 is an eye contact detection sensor to detect whether an eye of the user is contacting the eye piece 16.

A cover 202 is a cover of a slot to store a recording medium 200. A grip 90 is a holding unit having a shape such that the user can easily hold the digital camera 100 with their right hand to capturing images. When the user holds the digital camera 100 by gripping the grip 90 with their little finger, ring finger and middle finger, the shutter button 61 and the main electronic dial 71 are in positions that can be operated by the index finger of the right hand. In this state, the sub-electronic dial 73 is disposed in a position that can be operated by the thumb of the right hand.

Block Diagram of Digital Camera

Figure 2:
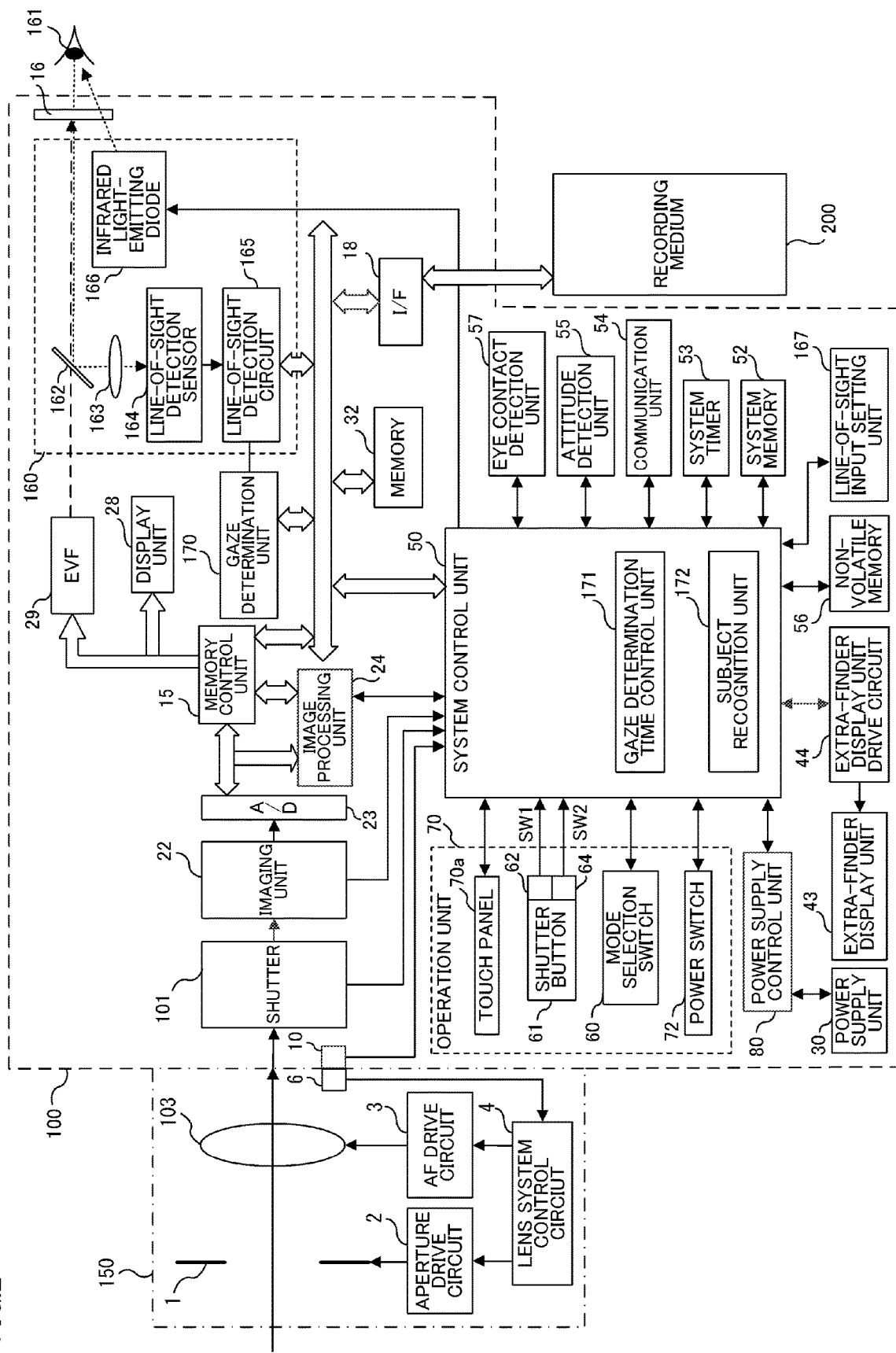
FIG. 2 is a block diagram depicting a configuration example of the digital camera according to the embodiment.

FIG. 2 is a block diagram depicting a configuration example of the digital camera 100. A lens unit 150 is a lens unit equipped with a replaceable image capturing lens. A lens 103 is normally constituted of a plurality of lenses, but is illustrated as one lens in FIG. 2 for simplification.

A communication terminal 6 is a communication terminal for the lens unit 150 to communicate with the digital camera 100, and a communication terminal 10 is a communication terminal for the digital camera 100 to communicate with the lens unit 150. The lens unit 150 communicates with a system control unit 50 via these communication terminals 6 and 10. Then the lens unit 150 controls an aperture 1 via an aperture drive circuit 2, using an internal lens system control circuit 4. The lens unit 150 also performs focusing by moving the lens 103 via an auto focus (AF) drive circuit 3 using the lens system control circuit 4.

A shutter 101 is a focal plane shutter which can freely control the exposure time of an imaging unit 22 based on the control by the system control unit 50.

The imaging unit 22 is an image pickup element constituted of a CCD, a CMOS element, or the like, to convert an optical image into electric signals. An A/D convertor 23 converts analog signals outputted from the imaging unit 22 into digital signals.

An image processing unit 24 performs predetermined image processing (e.g., pixel interpolation, such resizing processing as demagnification, color conversion processing) on the data from the A/D convertor 23 or the data from a memory control unit 15. The image processing unit 24 also performs predetermined arithmetic processing using the captured image data (captured image). The system control unit 50 performs exposure control and distance measurement control based on the arithmetic result acquired by the image processing unit 24. Thereby through-the-lens (TTL) type auto focus (AF) processing, auto exposure (AE) processing, pre-flash emission (EF) processing, and the like, are performed. Furthermore, the image processing unit 24 performs predetermined arithmetic processing using the captured image data, and performs TTL type auto white balance (AWB) processing based on the acquired arithmetic result.

The memory control unit 15 controls data transmission/reception among the A/D convertor 23, the image processing unit 24 and the memory 32. The output data from the A/D convertor 23 is written to the memory 32 via the image processing unit 24 and the memory control unit 15. In some cases, the output data from the A/D convertor 23 is written to the memory 32 via the memory control unit 15 without using the image processing unit 24. The memory 32 stores image data which was acquired by the imaging unit 22 and inverted into digital data by the A/D convertor 23, and stores image data to be displayed on the display unit 28 or the EVF 29. The memory 32 has a storage capacity that is sufficient to store a predetermined number of still images and a predetermined duration of moving images and sounds.

The memory 32 is also a memory for image display (video memory). The image data for display written in the memory 32 is displayed on the display unit 28 or the EVF 29 via the memory control unit 15. The display unit 28 and the EVF 29 perform display in accordance with the signals from the memory control unit 15 respectively, on such a displays as an LCD and an organic EL. If data, which was A/D-converted by the A/D convertor 23 and stored in the memory 32, is sequentially transferred to and displayed on the display unit 28 or the EVF 29, live view display (LV display) can be performed. An image displayed on the live view display is referred to as a live view image (LV image) herein below.

The display unit 28 and the EVF 29 have a plurality of display modes, such as the image capturing mode in which LV display is performed, the reproduction mode in which a captured image or moving image is reproduced, and a menu mode in which various settings are performed. The user can freely change the display mode by operating the operation unit 70. Switching of the display mode is determined in preference to other operations. Therefore when switching of the display mode is detected, the processing being performed at that point is interrupted and the processing in accordance with the selected display mode is executed.

A line-of-sight detection block 160 detects the line-of-sight of the user at the eye piece 16. The line-of-sight detection block 160 is constituted of a dichroic mirror 162, an image forming lens 163, a line-of-sight detection sensor 164, a line-of-sight detection circuit 165 and an infrared light-emitting diode 166.

The infrared light-emitting diode 166 is a light-emitting element to detect a line-of-sight position of the user in the finder screen, and emits an infrared light to an eye ball (eye) 161 of the user. The infrared light emitted from the infrared light-emitting diode 166 is reflected by the eye ball (eye) 161, and the infrared reflected light reaches to the dichroic mirror 162. The dichroic mirror 162 reflects only the infrared light, and allows visible light to pass. The infrared reflected light, of which optical path is changed, forms an image on an imaging surface of the line-of-sight detection sensor 164 via the image forming lens 163. The image forming lens 163 is an optical member constituting a line-of-sight detection optical system. The line-of-sight detection sensor 164 is constituted of an imaging device, such as a CCD type image sensor.

The line-of-sight detection sensor 164 performs photoelectric conversion on the entered infrared reflected light, and outputs the generated electric signal to the line-of-sight detection circuit 165. The line-of-sight detection circuit 165 detects the line-of-sight position of the user from the movement of the eye ball (eye) 161 of the user, based on the output signal of the line-of-sight detection sensor 164, and outputs the detected information to the system control unit 50 and a gaze determination unit 170.

The line-of-sight detection block 160 can detect the line-of-sight using a method called a corneal reflection method, for example. The corneal reflection method is a method of detecting the direction and position of the line-of-sight based on the positional relationship between: the reflected light generated when the infrared light emitted from the infrared light-emitting diode 166 is reflected largely by the cornea of the eye ball (eye) 161; and the pupil of the eye ball (eye) 161. The method of detecting the direction and position of the line-of-sight is not limited to the corneal reflection method, but may be chosen from various methods, such as a scleral reflection method, which uses the difference of reflectance of light between the black and the white of the eye. The line-of-sight detection block 160 may also use any method other than the above mentioned methods, as long as the direction and position of the line-of-sight can be detected.

In a case where a time when the line-of-sight of the user that is fixed to a certain region exceeds a predetermined threshold based on the detected information received from the line-of-sight detection circuit 165, the gaze determination unit 170 determines that the user is gazing at this region. The predetermined threshold can be set or be changed by a gaze determination time control unit 171 included ion the system control unit 50 in accordance with the user operation.

Various set values of the camera, such as the shutter speed and aperture, are displayed on the outer finder display unit 43 via an outer finder display unit drive circuit 44.

A non-volatile memory 56 is a memory which is electrically erasable and recordable, such as a flash-ROM. In the non-volatile memory 56, constants and programs for operating the system control unit 50, for example, are recorded. "Programs" here refers to the programs for executing various flow charts, which will be described later in this embodiment.

The system control unit 50 is a control unit constituted of at least one processor or circuit, and controls the digital camera 100 in general. The system control unit 50 implements each processing of this embodiment (described later) by executing the programs recorded in the above mentioned non-volatile memory 56. A system memory 52 is a RAM, for example, and the system control unit 50 develops the constants and variables for operating the system control unit 50 and the programs read from the non-volatile memory 56, in the system memory 52. The system control unit 50 also controls the display by controlling the memory 32, the display unit 28, and the like.

The system control unit 50 includes a subject recognition unit 172. The subject recognition unit 172 can recognize at least one subject located in an angle of view of the display unit 28, based on the result of arithmetic operation performed by the image processing unit 24.

The system timer 53 is a clock unit that measures the time used for various controls, and the time of the internal clock.

The mode selection switch 60 switches the operation mode of the system control unit 50 to a still image capturing mode, the moving image capturing mode or the reproduction mode, for example. The modes included in the still image capturing mode are: auto image capturing mode, auto scene determination mode, manual mode, aperture priority mode (Av mode), shutter speed priority mode (Tv mode) and program AE mode (P mode). Various scene modes and custom modes, to perform image capturing settings for each image capturing scene, are also included. The user can directly select any one of these modes using the mode selection switch 60. The user may also select an image capturing mode list screen using the mode selection switch 60 first, then select any one of the plurality of modes displayed on the list using another operation member. In the same manner, a plurality of modes may be included in the moving image capturing mode.

The shutter button 61 includes a first shutter switch 62 and a second shutter switch 64. The first shutter switch 62 is turned ON in mid-operation of the shutter button 61, that is, in the half-depressed state (image capturing preparation instruction), and generates a first shutter switch signal SW1. By the first shutter switch signal SW1, the system control unit 50 starts an image capturing preparation operation, such as auto focus (AF) processing, auto exposure (AE) processing, auto white balance (AWB) processing and pre-flash emission (EF) processing.

The second shutter switch 64 is turned ON when the operation of the shutter button 61 completes, that is, in the fully-depressed state (image capturing instruction), and generates a second shutter switch signal SW2. By the second shutter switch signal SW2, the system control unit 50 starts a series of operations of the image capturing processing, from reading signals from the imaging unit 22 to writing the captured image to the recording medium 200, as an image file.

The operation unit 70 is an input unit that receives an operation performed by the user (user operation), and is used to input various operation instructions to the system control unit 50. As illustrated in FIG. 2, the operation unit 70 includes the mode selection switch 60, the shutter button 61, the power switch 72, the touch panel 70a, and the like. The operation unit 70 also includes other operation members, such as the main electronic dial 71, the sub-electronic dial 73, the four-direction key 74, the SET button 75, the video button 76, the AE lock button 77, the magnifying button 78, the reproduction button 79 and the menu button 81.

The power supply control unit 80 is constituted of a battery detection circuit, a DC-DC convertor and switch circuits to switch blocks to be energized, and detects whether a battery is installed, the type of battery, and the residual amount of battery power, for example. The power supply control unit 80 also controls the DC-DC convertor based on the detection result and the instruction from the system control unit 50, and supplies the required voltage to each unit, including the recording medium 200, for a required period of time. A power supply unit 30 is constituted of a primary battery (e.g., alkali battery, lithium battery), a secondary battery (e.g., NiCd battery, NIMH battery, Li battery), an AC adapter, and the like.

A recording medium I/F 18 is an interface with the recording medium 200 (e.g., memory card, hard disk). The recording medium 200 is a recording medium to record captured images, such as a memory card, and is constituted of a semiconductor memory, a magnetic disk, or the like.

A communication unit 54 transmits/receives video signals and sound signals to/from an external apparatus connected wirelessly or via cable. The communication unit 54 can also be connected with a wireless local area network (LAN) and Internet. The communication unit 54 can also communicate with an external apparatus via Bluetooth (registered trademark) or Bluetooth Low Energy. The communication unit 54 can transmit an image (including an LV image) captured by the imaging unit 22 and an image recorded in the recording medium 200, and can receive image data and various other information from an external apparatus.

An attitude detection unit 55 detects an attitude of the digital camera 100 with respect to the direction of gravity. Based on the attitude detected by the attitude detection unit 55, it can be determined whether an image captured by the imaging unit 22 is an image captured by the digital camera 100 held horizontally, or an image captured by the digital camera 100 held vertically. The system control unit 50 can attach the orientation information in accordance with the attitude detected by the attitude detection unit 55 to an image file of an image captured by the imaging unit 22, or can rotate and record the image. For the attitude detection unit 55, an acceleration sensor, a gyro sensor, or the like can be used. The motion of the digital camera 100 (e.g., pan, tilt, lift, still) can be detected using the acceleration sensor or gyro sensor of the attitude detection unit 55.

The eye contact detection unit 57 detects the approach (contact) and the withdrawal (release) of an eye (object) 161 to/from the eye piece 16 of the finder. The system control unit 50 switches the display unit 28 and the EVF 29 between the display (display state) and the non-display (non-display state) in accordance with the state detected by the eye contact detection unit 57. Specifically, in the case where the state is at least the image capturing standby state and the display destination is set to automatic switching, the display destination is set to the display unit 28 (display of the display unit 28 is ON), and the EVF 29 is set to non-display in a non-eye contact state. In an eye contact state, on the other hand, the display destination is set to the EVF 29 (display of the EVF 29 is ON), and the display unit 28 is set to non-display.

For the eye contact detection unit 57, an infrared proximity sensor, for example, can be used, so as to detect the approach of an object to the eye piece 16 of the finder which includes the EVF 29. When an object approaches, the infrared light emitted from the light-emitting unit (not illustrated) of the eye contact detection unit 57 is reflected by the object, and is received by a light-receiving unit (not illustrated) of the infrared proximity sensor. The distance of the object to the eye piece 16 (eye piece distance) can also be determined by the amount of the received infrared light. In this way, the eye contact detection unit 57 performs eye contact detection to detect the proximity distance of the object to the eye piece 16.

The light-emitting unit and the light-receiving unit of the eye contact detection unit 57 may be devices separate from the above mentioned infrared light-emitting diode 166 and the line-of-sight detection sensor 164. However, the functions of the light-emitting unit of the eye contact detection unit 57 may be served by the infrared light-emitting diode 166. Further, the functions of the light-receiving unit may be served by the line-of-sight detection sensor 164.

If an object approaching the eye piece 16 by less than a predetermined distance in the non-eye contact state (non-approaching state) is detected, it is determined that the eye contacted the eye piece 16. If an object of which approach was detected moved away by at least a predetermined distance from the eye contact state (approaching state), it is determined that the eye was withdrawn. The threshold to detect the eye contact and the threshold to detect the eye withdrawal may be differentiated by hysteresis, for example. After eye contact is detected, it is assumed that the eye contact state continues until the eye withdrawal is detected. After eye withdrawal is detected, it is assumed that the non-eye contact state continues until the eye contact is detected. The infrared proximity sensor is merely an example, and another type of sensor may be used for the eye contact detection unit 57, as long as the sensor can detect the approach of an eye or an object that can be regarded as eye contact.

A line-of-sight input setting unit 167 sets enable/disable of line-of-sight detection performed by the line-of-sight detection circuit 165. The line-of-sight input setting unit 167 may set enable/disable of the processing that is executed by the line-of-sight input in the system control unit 50. For example, in the menu setting, the user can set enable/disable of the line-of-sight detection or the processing that is executed by the line-of-sight input.

The system control unit 50 performs the following operations to the eye piece 16, or detects the state thereof, based on the output from the line-of-sight detection block 160 or the eye contact detection unit 57.

a line-of-sight which is not turned to the eye piece 16 turns to the eye piece 16, that is, line-of-sight input starts the line-of-sight is being inputted to the eye piece 16 the eye piece 16 is being gazed into the line-of-sight, which was turning to the eye piece 16, turns away, that is, the line-of-sight input ends the line-of-sight is not inputted into the eye piece 16

"Gaze" here refers to the case where the line-of-sight position of the user does not move exceeding a predetermined moving amount within a predetermined time.

These operations, states and positions (directions) of the line-of-sight, with respect to the eye piece 16, are notified to the system control unit 50 via the internal bus. Then based on the notified information, the system control unit 50 determines the kind of operation (line-of-sight operation) that was performed on the eye piece 16.

The touch panel 70a and the display unit 28 may be integrated. For example, the touch panel 70a is configured so that the transmittance of the light does not interfere with the display on the display unit 28, and is superimposed on the upper layer of the display surface of the display unit 28. Then the input coordinates on the touch panel 70a are corresponded with the display coordinates on the display surface of the display unit 28. Thereby a graphic user interface (GUI), which allows the user to directly operate the screen displayed on the display unit 28, can be provided. The system control unit 50 can detect the following operations on the touch panel 70a or the state thereof a finger or pen which is not touching the touch panel 70a touches the touch panel 70a, that is, touch starts (hereafter Touch-Down)

a finger or pen is touching the touch panel 70a (hereafter Touch-On)

a finger or pen is moving in the state of touching the touch panel 70a (hereafter Touch-Move)

a finger or pen, which is touching the touch panel 70a, is released from the touch panel 70a, that is, touch ends (hereafter Touch-Up)

nothing is touching the touch panel 70a (hereafter Touch-Off)

When Touch-Down is detected, Touch-On is also detected at the same time. Unless Touch-Up is detected after Touch-Down, Touch-On is normally detected continuously. When Touch-Move is detected as well, Touch-On is detected at the same time. Even if Touch-On is detected, Touch-Move is not detected unless the touch position is moving. Touch-Off is detected when Touch-Up of all fingers or pen is detected.

These operations, states and coordinates of the positions of the fingers or pen touching the touch panel 70a are notified to the system control unit 50 via the internal bus.

Then based on the notified information, the system control unit 50 determines the kind of operation (touch operation) that was performed on the touch panel 70a.

For Touch-Move, the system control unit 50 can also determine the moving direction of the fingers or pen moving on the touch panel 70a, based on the change of the positional coordinates, for the vertical components and the horizontal components of the touch panel 70a respectively. If Touch-Move is detected for at least a predetermined distance, the system control unit 50 determines that the slide operation was performed. An operation of quickly moving a finger on the touch panel 70a for a certain distance in the touched state and then released is called "flick". In other words, flick is an operation of moving and releasing a finger rapidly on the touch panel 70a. If Touch-Move is detected for at least a predetermined distance at at least a predetermined speed, and Touch-Up is detected thereafter, the system control unit 50 then determines that flick was performed (determines that flick was performed after the slide operation).

Further, a touch operation of touching a plurality of points (e.g., two points) simultaneously and moving these touch positions closer together is called "Pinch-In", and a touch operation of moving these touch positions further apart is called "Pinch-Out". Pinch-In and Pinch-Out are collectively called a pinch operation (or simply "pinch"). For the touch panel 70a, various types of touch panels may be used, such as a resistive film type, a capacitive type, a surface acoustic wave type, an infrared type, an electromagnetic induction type, an image recognition type and an optical sensor type. There is a type of detecting touch when the touch panel is actually contacted, and a type of detecting touch when a finger or pen approaches the touch panel, but either type may be used.

AF Target Selection Control

An auto focus (AF) target selection control according to this embodiment will be described with reference to FIG. 3 to FIG. 6A and FIG. 6B. An AF target is a region or a subject that is selected (set) as a distance measurement region. In the case where an AF target is selected based on the line-of-sight input by the user, the line-of-sight of the user may deviate from the subject (AF target) considerably if the digital camera 100 moves a lot or a major change occurs to the subject. This means that the AF target may shift to a subject which the user did not intend to focus on. In the image capturing processing according to this embodiment, the digital camera 100 switches whether the AF target selection based on the line-of-sight input is enabled or disabled, therefore a shift of the AF target unintended by the user can be prevented.

Figure 3:
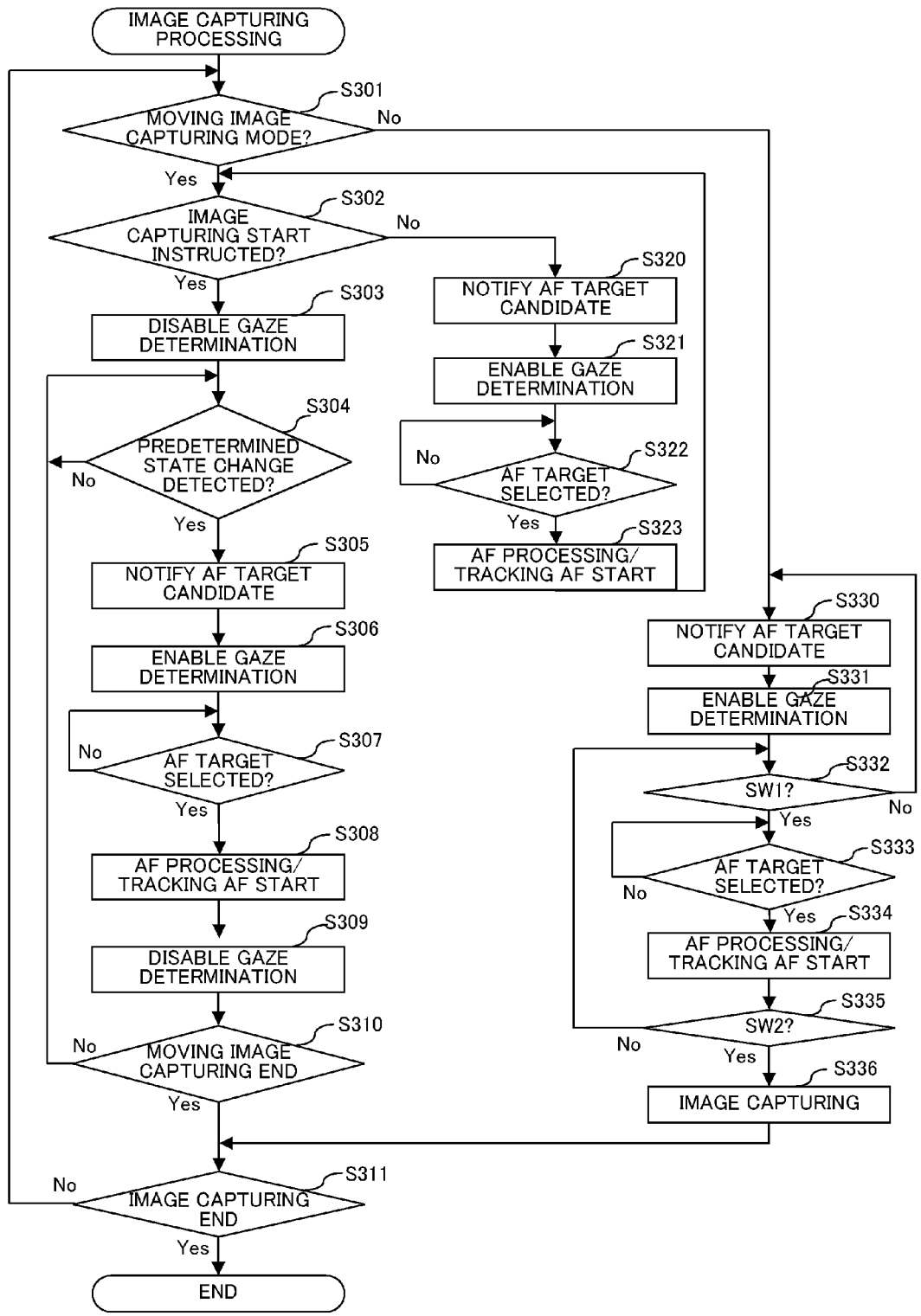
FIG. 3 is a flow chart depicting an example of AF target selection control in image capturing processing according to the embodiment.
Figure 4:
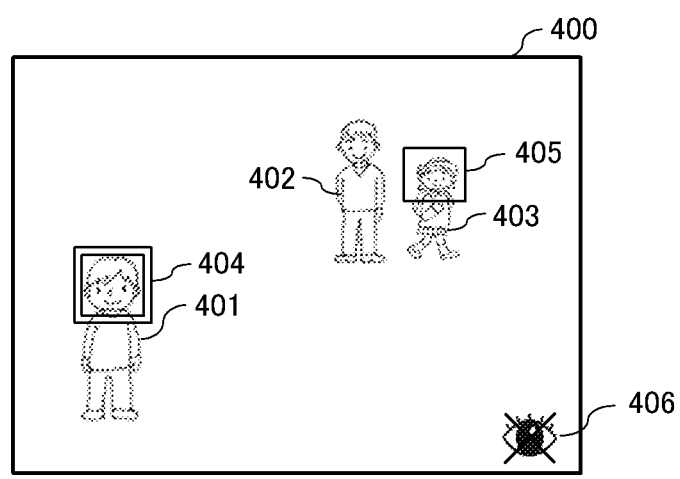
FIG. 4 is a diagram illustrating a display example in the case where the AF target selection, based on the line-of-sight input according to the embodiment, is disabled.
Figure 5A:
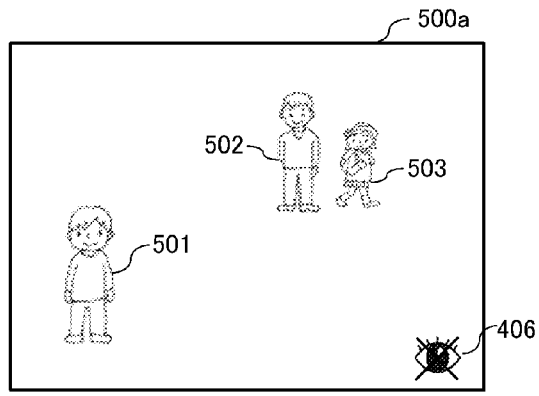
FIG. 5A to FIG. 5E are diagrams illustrating display examples in the case where the AF target selection, based on the line-of-sight input according to the embodiment, is enabled.
Figure 5D:
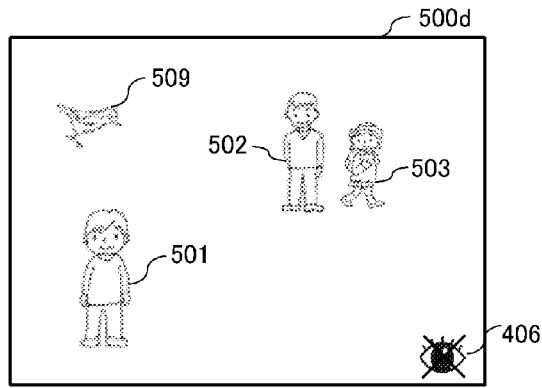

FIG. 3 is a flow chart depicting an example of an AF target selection control based on the line-of-sight input in the image capturing processing. FIG. 4 is a display example on the EVF 29 in the case where the AF target selection based on the line-of-sight input is disabled (step S303, step S309). FIG. 5A to FIG. 5E are diagrams illustrating an example of a predetermined state change (step S304), which is a condition to enable the AF target selection based on the line-of-sight input. FIG. 6A and FIG. 6B are display examples on the EVF 29 in the case of selecting an AF target based on the line-of-sight input (step S305 to S307).

Each processing in the flow chart in FIG. 3 is implemented by the system control unit 50 developing a program, which is stored in the non-volatile memory 56, in the system memory 52, and controlling each functional block.

The flow chart in FIG. 3 is started when the digital camera 100 is started, and the display mode of the display unit 28 or the EVF 29 is switched to the image capturing mode, for example.

The image capturing mode includes the moving image capturing mode and the still image capturing mode. Processing in step S303 to step S310 is processing that is performed during moving image capturing in the moving image capturing mode. Processing in step S320 to step S323 is processing that is performed before starting moving image capturing in the moving image capturing mode. Processing in step S330 to step S336 is processing that is performed in the still image capturing mode.

In the example in FIG. 3, the processing to select an AF target based on the line-of-sight input will be described, assuming that an AF target is selected by determining whether the user gazed at the AF target. "Gaze" is a state where movement of the line-of-sight position of the user does not exceed a predetermined moving amount within a predetermined time.

In step S301, the system control unit 50 determines whether the display mode is the moving image capturing mode. If the display mode is the moving image capturing mode, processing advances to step S302, and if the display mode is the still image capturing mode, processing advances to step S330.

In step S302, the system control unit 50 determines whether start of image capturing is instructed by user operation. If start of image capturing is instructed, processing advances to step S303, and processing during moving image capturing is executed. If start of image capturing is not instructed, processing advances to step S320, and processing before moving image capturing is executed.

Moving Image Capturing Mode: During Moving Image Capturing

In step S303, the system control unit 50 disables the gaze determination by the gaze determination unit 170. In other words, the system control unit 50 disables the line-of-sight input by the user, and disables the processing to select a gazed subject (AF target candidate) as an AF target. The system control unit 50 changes the display information on the EVF 29 to notify the user that the gaze determination is disabled.

A specific example of changing the display information on the EVF 29 to notify the user that the gaze determination is disabled will be described with reference to FIG. 4. FIG. 4 is a display example (display image 400) on the EVF 29 when the AF target selection based on the line-of-sight input is disabled. The display image 400 includes subjects 401 to 403 within the angle of view.

A double line frame 404 is a frame (item) that indicates an AF control target subject, and surrounds a subject which the user selected as an image capturing target before starting image capturing (hereafter also referred to as "main subject"). A solid line frame 405 is a frame (item) that indicates the line-of-sight position of the user. The double line frame 404 to indicate the AF target and the solid line frame 405 to indicate the line-of-sight position of the user are displayed as display information on the EVF 29. The solid line frame 405 is not displayed in the case where the AF target selection based on the line-of-sight input is disabled.

An item 406 is an item to notify the user that the gaze determination by the gaze determination unit 170 is disabled, that is, the line-of-sight input by the user is disabled. The user can recognize that the gaze determination is disabled while the item 406 is displayed. In the example of FIG. 4, the line-of-sight position of the user is on a face of a subject 403 that is different from the current main subject 401, but the subject 403 is not selected as the AF target since the AF target selection based on the line-of-sight is disabled. The display on the EVF 29, to notify the user that the AF target selection based on the line-of-sight input is disabled, may be text information, for example, instead of such an item as the item 406. The display position of the item or text may be around the AF target, the frame to indicate the line-of-sight position of the user, or the like.

In step S304, the system control unit 50 determines whether a predetermined state change is detected. If the predetermined state change is detected, processing advances to step S305, and if the predetermined state change is not detected, the processing in step S304 is repeated. The predetermined state change is, for example, "the main subject moves out of the angle of view", "composition of image capturing changes", "a number of recognized subjects in the angle of view changes" or "a moving amount of a subject radically changes". The predetermined state change is detected by the image processing unit 24 analyzing the image captured by the imaging unit 22.

The predetermined state change is not limited to the above example, and an unintentional shift of the line-of-sight position of the user to a subject that is different from an AF target subject, for example, may be determined as Yes (predetermined state change is detected) in step S304. The predetermined state change may be detected by detecting the movement of the digital camera 100 (imaging unit) instead of the above mentioned detection method. If at least the above mentioned predetermined state change is not detected in both the captured image and the imaging unit, the system control unit 50 controls so that the AF processing based on the line-of-sight position of the user is not executed. The state where at least the predetermined state change is not detected in the captured image and in the imaging unit is a "first state". The state where the predetermined state change is detected (a predetermined condition is satisfied) is a "second state".

A specific example of the predetermined state change, which is a condition to enable the AF target selection based on the line-of-sight input, will be described with reference to FIG. 5A to FIG. 5E. FIG. 5A is a display example (display image 500*a*) on the EVF 29 before detecting the predetermined state change. The display image 500*a* includes the subjects 501 to 503 within the angle of view.

Figure 5B:
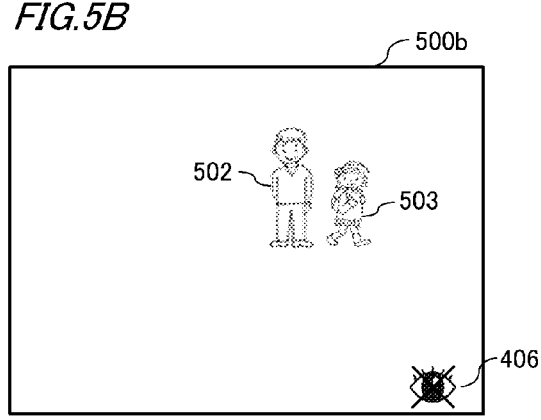
Figure 6A:
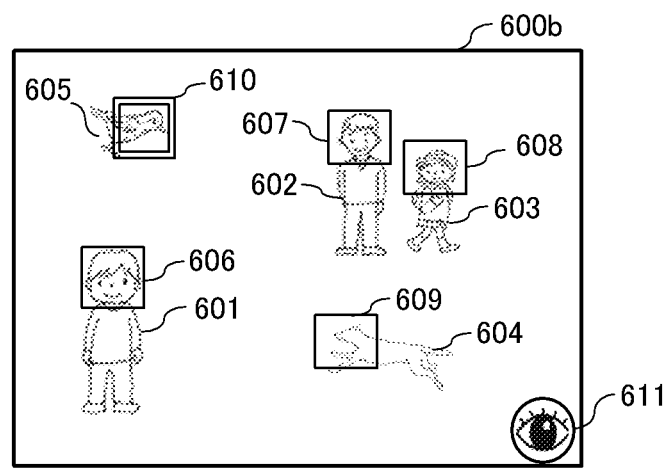
FIG. 6A and FIG. 6B are diagrams illustrating display examples in the case of selecting an AF target based on the line-of-sight input according to the embodiment.
Figure 6B:
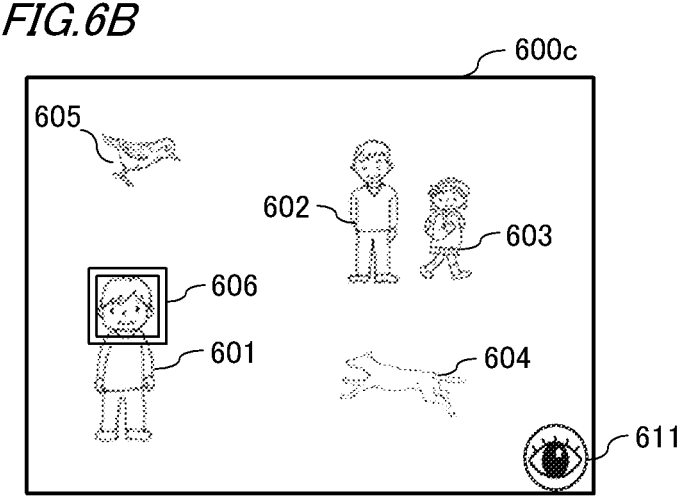

FIG. 5B is a display example (display image 500*b*) on the EVF 29 in the case where the state change "the main subject moves out of the angle of view" is detected in the state of FIG. 5A. In the case of detecting the state change "the main subject moves out of the angle of view", the AF target selection based on the line-of-sight input is enabled, and an AF target can be reselected by the line-of-sight input.

"The main subject moves out of the angle of view" refers to a state change that the subject selected as the AF target is no longer recognized in the captured image. The main subject no longer being recognized in the captured image is a case where the main subject is not recognized for a predetermined time (a predetermined number of frames), such as two seconds or three seconds, by the subject recognition unit 172. The processing up to reselecting an AF target will be described in step S305 to step S307.

Figure 5E:
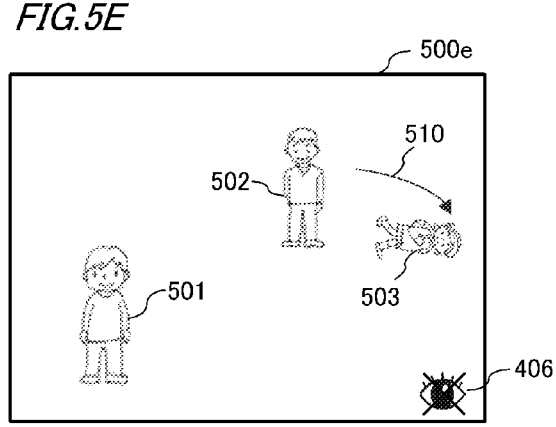
Figure 5C:
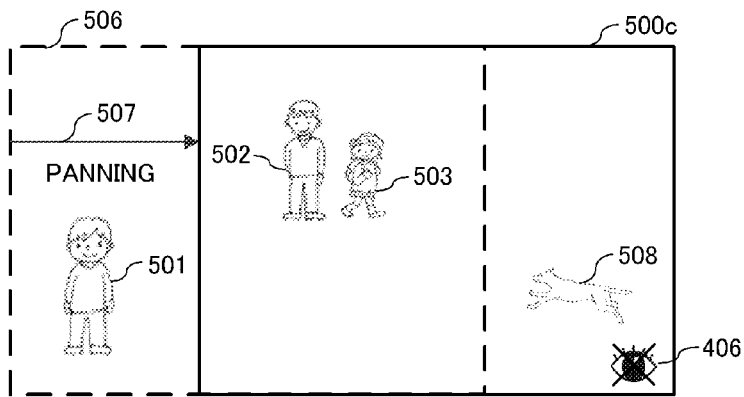

FIG. 5C is a display example (display image 500*c*) on the EVF 29 in the case where the state change "composition of image capturing changes" is detected in the state of FIG. 5A. A dotted line frame 506 indicates the composition (display image 500*a*) in the state of FIG. 5A. The display image 500*c* after the change of composition includes the subject 502 and the subject 503, and further includes a subject 508 which entered the angle of view due to the panning operation by the user. The subject 501 moves out of the angle of view due to the panning operation by the user, and is no longer included in the display image 500*c*.

An arrow mark 507 indicates the change of composition caused by the panning operation of the user. The panning operation can be detected by the gyro sensor or the acceleration sensor of the attitude detection unit 55. The system control unit 50 can detect the change of composition of the image capturing by detecting the panning operation. The attitude detection unit 55 may determine the state change of "composition changes" when the digital camera 100 is turned in a certain direction by at least a predetermined amount, such as 50° or 60°, for example.

The system control unit 50 determines that the composition has changed not just by detection of the panning operation, but also by the detection of the tilting operation, rolling operation, zoom operation, or the like. In the case of the zoom operation, the system control unit 50 determines that the composition has changed when the user changes the zoom of the digital camera 100 for at least a predetermined amount, such as from ×1 to ×5 or from ×2 to ×15. In the case where the state change "composition changes" is detected, the user can reselect an AF target based on the line-of-sight input.

FIG. 5D is a display example (display image 500*d*) on the EVF 29 in the case where the state change "a number of recognized subjects in the angle of view changes" is detected in the state of FIG. 5A. "A number of recognized subjects in the angle of view changes" refers to a state change that a number of subjects captured in the image changes.

In the example in FIG. 5D, a subject 509 is a new subject that entered into the angle of view of the EVF 29 in the state of FIG. 5A. In the display image 500*a* in FIG. 5A, a number of recognized subjects is three, but in the display image 500*d* in FIG. 5D, a number of recognized subjects increases to four since the subject 509 entered into the angle of view.

Increase/decrease in the number of recognized subjects in the angle of view can be calculated by the subject recognition unit 172 detecting subjects in the captured image, for example. In the case where the state change "a number of recognized subjects in the angle of view changes" is detected, the user can reselect an AF target based on the line-of-sight input. In the case where a number of subjects increases, it is possible that the user wants to change the AF target to a new subject. In the case where a number of subjects decreases as well, it is possible that the user wants to change the AF target, since the positional relationships of the subjects may change. Therefore when a number of subjects changes, the selection of the AF target based on the line-of-sight input is enabled so that the user can easily change the AF target. In the case where a number of original subjects is at least a predetermined number, such as the case where a number of subjects changes from 15 to 16 or from 20 to 21, for example, the determination in step S304 may be No. This is because when a number of individuals in the angle of view is high, (e.g., group photo), it is less like that a new individual who entered the angle of view becomes an AF target. Further, if determination in step S304 is Yes, selection of an AF target based on the line-of-sight input would be enabled each time an individual enters the angle of view. Then the time when the selection of an AF target based on the line-of-sight input is enabled becomes long, the AF target that is determined once is easily shifted. Therefore No is determined in step S304, even if a number of subjects in the angle of view changes when a number of subjects is at least a predetermined number, then operability of the user does not diminish.

FIG. 5E is a display example (display image 500e) on the EVF 29 in the case where the state change "moving amount of a subject radically changes" is detected in the state of FIG. 5A. An arrow mark 510 is an arrow mark to describe that the moving amount of the subject 503 radically changed, and is not displayed on the actual screen. The radical change of the moving amount is, for example, "a moving subject stops", "a stopping subject starts to move", and "a moving amount of the subject is at least a predetermined value (e.g., half or ⅓ an imaging angle of view)". Further, the radical change of the moving amount may be "direction of the movement of the subject changes from the original motion vector by a predetermined angle (e.g., at least 90°, at least 120°)". The system control unit 50 can detect radical change of the moving amount based on the detected position or change of size of each subject. In the case of detecting the state change "a moving amount of a subject radically changes", the user can reselect an AF target based on the line-of-sight input.

The predetermined state change in step S304 has been described using specific examples, but the predetermined state change is not limited to these examples, but may be any state change after which the user may reselect an AF target.

In step S305, the system control unit 50 performs a display to indicate a subject that may become an AF target (hereafter AF target candidate). By displaying a selection frame for an AF target candidate, the system control unit 50 can notify the user on the AF target candidate.

A concrete display example after a predetermined state change is detected will be described with reference to FIG. 6A. FIG. 6A is a display example (display image 600b) on the EVF 29 in step S306. The display image 600b includes a subject 601 to subject 605 in an angle of view. A selection frame 606 to selection frame 609 are frames to notify the user on the subjects to be AF target candidates by indicating these subjects such that the user can recognize them. The selection frame 610 is a frame to indicate that the subject 605 is the current AF target, and is indicated by a double line frame. In this way, the current AF target is displayed in a display mode that is different from the other AF target candidates.

An item 611 is an item to notify the user that selecting an AF target based on the line-of-sight is enabled. By the item 611 being displayed, the user can recognize that re-selecting an AF target based on the line-of-sight input is enabled.

In the case where the current AF target continuously exists in the angle of view after the predetermined state change is detected, a guide (notification) to indicate that the AF target is not changed by continuously gazing at the current AF target may be displayed on the EVF 29.

In step S306, the system control unit 50 enables the line-of-sight input by the user, and enables the gaze determination by the gaze determination unit 170.

In step S307, the system control unit 50 determines whether an AF target is selected based on the line-of-sight input by the user. An AF target is selected when gaze of the user at an AF target candidate for a predetermined time (e.g., two seconds, three seconds) is detected. The gaze at an AF target candidate can be detected by the gaze determination unit 170. If an AF target is selected based on the line-of-sight input by the user, processing advances to step S308. If an AF target is not selected, the processing in step S307 is repeated.

In step S308, the system control unit 50 sets the AF target candidate selected based on the line-of-sight input to an AF target region. The system control unit 50 performs the AF processing on the AF target region that is set, and starts processing to track the selected AF target as a focal point.

In the case where an AF target is selected based on the line-of-sight input by the user, the system control unit 50 notifies the selected AF target to the user by changing the display of the EVF 29. A concrete display example 600c, in the case where an AF target is selected based on the line-of-sight input by the user, will be described with reference to FIG. 6B. FIG. 6B indicates a state after the user gazed at an AF target for at least a predetermined time in the state of FIG. 6A. A frame superimposed on the selected subject changes from the selection frame 606 in FIG. 6A to a double line frame (selection frame 606 in FIG. 6B). Thereby the user can recognize that re-selection of an AF target is completed.

A predetermined time t, which is a threshold to determine whether a subject is being gazed at may be freely set. For example, the predetermined time t may be set to a different time in advance in accordance with each state change described in FIG. 5B to FIG. 5E, or may be set by the user via a menu screen or the like. The system control unit 50 may perform servo AF on an AF target selected based on the line-of-sight input (gaze) by the user.

In step S309, the system control unit 50 disables the AF target selection based on the line-of-sight input, just like step S303.

A case where the line-of-sight position of the user did not shift from the current AF target to another subject in the processing from step S307 to step S309 will be described here. In step S307, an AF target is not changed from the current AF target if the line-of-sight position of the user does not shift from the current AF target to another subject for a predetermined time (e.g., two seconds, three seconds, 3.5 seconds) since when the predetermined state change has been detected in step S304. In this case, AF processing and tracking AF processing on the current AF target has already started, hence the system control unit 50 advances processing to step S309 without executing the processing in step S308. In step S309, the selection of an AF target based on the line-of-sight input is disabled if a predetermined time elapsed while the current AF target is gazed at after the predetermined state change is detected in step S304.

In step S310, the system control unit 50 determines whether the moving image capturing ended. If the moving image capturing ended, processing advances to step S311. If the moving image capturing is continuing, processing returns to step S304.

Moving Image Capturing Mode: Before Moving Image Capturing

The processing from step S320 to step S323 is processing before moving image capturing in the moving image capturing mode, and is processing to select (set) a region of an AF target based on the line-of-sight input by the user before starting image capturing. Before the moving image capturing in the moving image capturing mode, the system control unit 50 selects an AF target based on the line-of-sight input by the user, even if a predetermined state change is not detected. When a moving image is not being captured (e.g., after capturing a moving image ends), the system control unit 50 sets an AF target region based on the line-of-sight input by the user. The processing from step S320 to step S323 is the same as the processing from step S305 to step S308 respectively. When it is not during moving image recording, recording is not performed even if the AF target subject changes, hence the selection of an AF target based on the line-of-sight input is not disabled so that the AF target subject can be quickly switched.

Still Image Capturing Mode

The processing from step S330 to step S336 is processing to select (set) an AF target region based on the line-of-sight input by the user in the still image capturing mode. In the still image capturing mode, the system control unit 50 sets an AF target region based on the line-of-sight input by the user, regardless whether the predetermined state change is detected or not. In the case of the still image capturing mode, recording is not performed unless image capturing is instructed, hence selection of an AF target based on the line-of-sight input is not disabled so that the AF target can be quickly switched.

Each processing in steps S330, S331, S333 and S334 is the same as each processing in steps S305, S306, S307 and S308 respectively. After the processing in steps S330 and S331, processing advances to step S332.

In step S332, the system control unit 50 determines whether the first shutter switch 62 is turned ON by half-depressing the shutter button 61 (whether image capturing preparation is instructed). If the first shutter switch 62 is turned ON, processing advances to step S333. If the first shutter switch 62 is not turned ON, processing returns to step S330. In the still image capturing mode, the AF processing/tracking AF in step S334 is started in accordance with the image capturing preparation instruction, hence the processing in steps S333 and S334 is performed when the image capturing preparation is instructed in step S332.

In step S335, the system control unit 50 determines whether the second shutter switch 64 is turned ON by fully depressing the shutter button 61 (whether image capturing is instructed). If the second shutter switch 64 is turned ON, processing advances to step S336. If the second shutter switch 64 is not turned ON, processing returns to step S332. In step S336, the system control unit 50 executes the image capturing processing, and the processing in the still image capturing mode ends.

In step S311, the system control unit 50 determines whether the image capturing process ends. The image capturing processing ends when the current state is changed to the reproduction mode or to the menu screen, or when the power of the digital camera 100 is turned OFF. The processing returns to step S301 if the image capturing processing is continuing.

According to the embodiment described above, execution of processing unintended by the user can be reduced when the processing is executed based on the line-of-sight during recording a moving image. During recording of a moving image, selection of an AF target based on the line-of-sight input is enabled if the predetermined state change is detected, and is disabled if not, whereby the possibility of unintended change of an AF target caused by the movement of the line-of-sight position can be reduced.

In the above mentioned step S305, step S320 and step S330, AF target candidates are notified to the user by enclosing each AF target candidate by a selection frame in advance, but this is an example, and the selection frame may not be displayed in advance.

The frame to notify the line-of-sight position of the user may be displayed in white, or may be highlighted by a bold frame or flashing frame for one or two seconds after the line-of-sight input is enabled. Further, the display mode of the frame to notify the line-of-sight position of the user may change as time elapses (e.g., frame darkens or line of frame thickens). Furthermore, the display mode of the frame may gradually change from a single line to a double line in accordance with the elapsed time from the start of the gaze at a subject. Thereby the user can recognize that selection of an AF target is determined if the AF target is continuously gazed at until the change of the display mode of the frame completes.

In the case where a predetermined time (e.g., five seconds, seven seconds) elapsed after the determination in step S304 becomes Yes, the original AF target may be continuously selected as long as this AF target is within an angle of view, even if the determination in step S307 does not become Yes.

In the above embodiment, a case of selecting an AF target was described as an example, but the above embodiment is also applicable to a case of selecting a photometric region (AE target) instead of a distance measurement region.

In step S303 in FIG. 3, the system control unit 50 disables the gaze determination by the gaze determination unit 170, but the present invention is not limited to this, and the system control unit 50 may disable the line-of-sight detection based on the line-of-sight detection block 160.

In step S304 in FIG. 3, it is determined whether a predetermined state change is detected, but the present invention is not limited to this. The system control unit 50 may acquire information related to the captured image, and determine whether the acquired information satisfies a predetermined condition. The information related to the captured image is the brightness information in each frame, for example, and the system control unit 50 may enable the AF processing based on the line-of-sight input when the change amount of the average value of the brightness values of the frames is at least a predetermined threshold.

In the above embodiment, an example of enabling or disabling the processing to select an AF target based on the line-of-sight input was described, but the present invention is not limited to this. The present invention is also applicable to the processing to select a subject of an AE processing target based on the line-of-sight input, for example.

In the above description, various controls mentioned above are performed by the system control unit 50, but may be performed by one hardware component or by a plurality of hardware components (e.g., a plurality of processors and circuits) which share the processing to control the entire apparatus.

While the present invention has been described with reference to the preferred embodiments, the present invention is not limited to these specific embodiments, and includes various modes within the scope that does not depart from the essence of the invention. Each of the above embodiments is merely an example of the invention, and may be combined as required.

In the above embodiment, a case of applying the present invention to a digital camera (image capturing control apparatus) was described as an example, but the present invention is not limited to this, but is applicable to any image capturing control apparatus that can accept line-of-sight input. For example, the present invention is applicable to a portable telephone terminal, a portable image viewer, a printer that includes a finder, a digital photo frame, a music player, a game machine and an electronic book reader.

According to this invention, the possibility of executing processing unintended by the user can be reduced when processing is executed based on the line-of-sight during recording a moving image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-007424, filed on Jan. 21, 2020, which is hereby incorporated by reference herein in its entirety.

What is claimed is:

1. An image capturing control apparatus comprising at least one memory and at least one processor which function as:
   a line-of-sight detection unit configured to detect a line-of-sight position of a user;
   a setting unit configured to set a region, in which specific processing related to image capturing is performed, in accordance with the line-of-sight position detected by the line-of-sight detection unit; and
   a control unit configured to implement control such that in a case of a first state, where a change of at least a predetermined amount does not occur in a captured image and an imaging unit, during recording a moving image, a region in which the specific processing is performed based on the line-of-sight position of the user is not set, and that in a case of a second state, which is different from the first state and satisfies a predetermined condition, a region in which the specific processing is performed based on the line-of-sight position of the user, detected by the line-of-sight detection unit, is set.

2. The image capturing control apparatus according to claim 1, wherein the control unit implements control such that in still image capturing, a region in which the specific processing is performed is set based on the line-of-sight position of the user, regardless whether the predetermined condition is satisfied.

3. The image capturing control apparatus according to claim 1, wherein the control unit implements control such that while the moving image is not being captured in moving image capturing, a region in which the specific processing is performed is set based on the line-of-sight position of the user, regardless whether the predetermined condition is satisfied.

4. The image capturing control apparatus according to claim 1, wherein in a case of a second state where the predetermined condition is satisfied, the control unit implements control such that the line-of-sight input by the user is enabled.

5. The image capturing control apparatus according to claim 1, wherein in a case where the specific processing is executed based on the line-of-sight input by the user in a second state where the predetermined condition is satisfied, the control unit implements control such that the line-of-sight input by the user is disabled.

6. The image capturing control apparatus according to claim 1, wherein the specific processing is auto focus (AF) processing.

7. The image capturing control apparatus according to claim 1, wherein the control unit implements control such that in a case where the line-of-sight input by the user is enabled, an item indicating the line-of-sight position of the user is displayed in the captured image, and in a case where the line-of-sight input by the user is disabled, an item indicating the line-of-sight position of the user is not displayed.

8. The image capturing control apparatus according to claim 1, wherein in a case where the line-of-sight input by the user is not enabled, the control unit notifies the user that the execution of the specific processing based on the line-of-sight position of the user is not enabled.

9. The image capturing control apparatus according to claim 1, wherein in a case where the line-of-sight input by the user is enabled, the control unit notifies the user that the execution of the specific processing based on the line-of-sight position of the user is enabled.

10. The image capturing control apparatus according to claim 1, wherein the second state is a state where the number of subjects captured in the captured image has changed.

11. The image capturing control apparatus according to claim 1, wherein the second state is a state where a subject selected as an image capturing target is no longer recognized in the captured image.

12. The image capturing control apparatus according to claim 1, wherein the second state is a state where composition of the captured image has changed.

13. The image capturing control apparatus according to claim 12, wherein the state where composition of the captured image has changed is detected by detecting movement of the image capturing control apparatus using an acceleration sensor or a gyro sensor.

14. The image capturing control apparatus according to claim 12, wherein the state where composition of the captured image has changed is detected by detecting driving of a lens unit.

15. The image capturing control apparatus according to claim 1, wherein the second state is a state where a moving amount of a subject captured in the captured image has changed by exceeding a predetermined threshold.

16. A control method for an image capturing control apparatus, the method comprising:
- a line-of-sight detection step of detecting a line-of-sight position of a user;
- a setting step of setting a region, in which specific processing related to image capturing is performed, in accordance with the line-of-sight position detected in the line-of-sight detection step; and
- a control step of implementing control such that in a case of a first state where a change of at least a predetermined amount does not occur in a captured image and an imaging unit during recording a moving image, a region in which the specific processing is performed based on the line-of-sight position of the user is not set, and that in a case of a second state, which is different from the first state and satisfies a predetermined condition, a region in which the specific processing is performed based on the line-of-sight position of the user, detected in the line-of-sight detection step, is set.

17. A non-transitory computer-readable storage medium storing a program for causing a computer to execute:
- a setting step of setting a region, in which specific processing related to image capturing is performed, in accordance with the line-of-sight position detected in the line-of-sight detection step; and
- a control step of implementing control such that in a case of a first state where a change of at least a predetermined amount does not occur in a captured image and an imaging unit during recording a moving image, a region in which the specific processing is performed based on the line-of-sight position of the user is not set, and that in a case of a second state, which is different from the first state and satisfies a predetermined condition, a region in which the specific processing is performed based on the line-of-sight position of the user, detected in the line-of-sight detection step, is set.

* * * * *